United States Patent [19]

Harvey

[11] Patent Number: 5,028,293

[45] Date of Patent: Jul. 2, 1991

[54] CONTINUOUS MOTION BOTTLE DECORATING APPARATUS

[75] Inventor: Albert J. Harvey, Fairfield, Ohio

[73] Assignee: Dinagraphics, Inc., Cincinnati, Ohio

[21] Appl. No.: 312,113

[22] Filed: Feb. 17, 1989

Related U.S. Application Data

[63] Continuation of Ser. No. 15,887, Feb. 18, 1987, Pat. No. 4,806,197.

[51] Int. Cl.[5] .......... B65C 9/04; B32B 1/00; B44C 1/00

[52] U.S. Cl. .......... 156/449; 156/456; 156/476; 156/542; 156/DIG. 26

[58] Field of Search .......... 156/230, 238, 240, 361, 156/446, 447, 448, 449, 455, 456, 540, 541, 542, 497, 558, 475, 476, DIG. 24, DIG. 26

[56] References Cited

U.S. PATENT DOCUMENTS

| | | | |
|---|---|---|---|
| 3,200,027 | 8/1965 | Fairest | 156/449 |
| 3,979,247 | 9/1976 | Berg | 156/238 |
| 4,019,935 | 5/1977 | Harvey | 156/361 |
| 4,021,286 | 5/1977 | Amberg | 156/446 |
| 4,239,569 | 12/1980 | Harvey | 156/542 |
| 4,239,570 | 12/1980 | Kerwia | 156/238 |
| 4,255,750 | 8/1981 | DeMartino | 156/449 |
| 4,272,311 | 6/1981 | D'Angelo et al. | 156/449 |
| 4,290,519 | 9/1981 | Harvey | 156/361 |
| 4,315,795 | 2/1982 | Jodrey et al. | 156/361 |
| 4,399,178 | 8/1983 | Barta | 156/238 |
| 4,539,003 | 9/1985 | Cue et al. | 156/238 |
| 4,545,832 | 10/1985 | Hoffmann | 156/446 |
| 4,735,664 | 4/1988 | Asghar | 156/361 |
| 4,806,197 | 2/1989 | Harvey | 150/542 |

*Primary Examiner*—John J. Gallagher
*Assistant Examiner*—Louis Falasco
*Attorney, Agent, or Firm*—Kenyon & Kenyon

[57] ABSTRACT

An apparatus for decorating the outer surface of a hollow article, such as a bottle, with a label, which includes a turret for transporting the article and a label from a loading to an unloading location while simultaneously rotating the article around its own axis which facilitates the label to be transferred to the outer surface of the bottle. The turret also includes nozzles which engage each article at the decorating station. Furthermore, air may be blown into the article through the nozzle to support the article in instances when said article is made of a plastic or other deformable material. The apparatus also includes an indexing station for turning the article to a preelected orientation before the application of the label. The article is preferably mounted in such manner that the label is not applied on a seam of the bottle.

22 Claims, 8 Drawing Sheets

CONTINUOUS MOTION BOTTLE DECORATING APPARATUS

RELATED APPLICATIONS

This is a continuation in part to U.S. application Ser. No. 015,887, filed Feb. 18, 1987, entitled CONTINUOUS MOTION ROUND BOTTLE TURRET (to issue as U.S. Pat. No. 4,806,197 on Feb. 21, 1989).

BACKGROUND OF THE INVENTION

A. Field of the Invention

This invention relates generally to a heat transfer labelling apparatus and a method of applying a heat transferable label to a hollow article. More particularly, this invention relates to such an apparatus wherein hollow inflatable articles such as bottles are decorated in a continuous operation.

Frequently such hollow articles are made in a two section mold producing articles having corresponding parting or seam lines. This invention also relates to an apparatus and method for indexing the hollow article so that the label is appropriately positioned and does not overlap a seam line. In this manner, distortions of the label are avoided, a factor particularly important when decorating labels including fine print.

B. Description of the Prior Art

Numerous decorating techniques are known in the art, some of which include the application of a label onto a hollow article to be decorated. One of the techniques which is desirable in this type of decorating is the usage of a heat transferable label which includes a decorative predetermined design thereon and may thus be transferred onto the article or container being decorated.

The heat transfer process permits for multicolored designs to be applied to the container in a single operation. The heat transfer process involves the use of a release-coated carrier upon which the design to be transferred is printed. The design is transferred from the web-like carrier to the container generally by using a combination of heat and pressure. The principal advantage of the heat transfer technique is that multicolored designs of an infinite variety may be applied to a container.

Because of the heat requirement associated with the release and application of the label from the web onto the container, it has been generally accepted practice to maintain the container in a stationary position, albeit rotatable in the instances of circular containers, during the decorating step. This has resulted in numerous prior art types of apparatus which employ intermittently moving mechanisms for conveying a container to a decorating station, engaging the container while a label is applied to the container, and then removing the container from the decorating station.

In my U.S. Pat. Nos. 4,239,569, 4,275,856 and 4,209,519, apparatus are disclosed which overcome some of the disadvantages of the prior art described above. In these apparatus, the articles and the label carrying web travel in two substantially parallel planes at the same speed to allow the transfer of the label while in motion. However, the articles decorated by these machines have relatively flat label-carrying surfaces.

My U.S. Pat. No. 4,019,935 discloses an apparatus in which bottles placed on a turret pass by a decorating station. At the station, labels from a web are transferred by a relatively flat and stationary presser to the bottles.

In this machine, however, only a minor portion of the bottle surface facing the stationary presser can be used to hold a label and therefore the size of the label is limited. Thus, this machine is not generally used to affix a label extending around substantially the entire circumference of the bottle.

SUMMARY OF THE INVENTION

Briefly stated, the invention herein disclosed provides an apparatus for continuously applying heat transfer labels carried on an elongated web to individual hollow articles or containers to be decorated. Included in the apparatus is a conveying means which continuously conveys the articles to a decorating station including a plurality of receptacle means suitable for receiving and holding the articles to be decorated as they pass therethrough. The receptacle means containing the articles to be decorated are continuously driven at the decorating station at the same speed as the label carrying web. Additionally, the receptacles also rotate the articles with respect to the web, to allow the label to be applied on a surface of the articles. Means are provided for heating the labels carried on the web prior to their arrival at the decorating station. At the decorating station, means are provided for engaging and inflating the article as well as means for urging the heated label into engagement with the article to be decorated. Downstream of the decorating station is positioned a further conveying means to carry the decorated articles away from the decorating station.

In one of the embodiments of the invention, a vacuum chamber is disposed beneath the conveying means which itself includes a plurality of openings therein. In this manner a vacuum is applied to the bottom of the article being carried along on the conveying means thus restricting and stabilizing its movement. The article is fed from the conveying means in a spaced relationship into the receptacle means by means of a worm screw and a star-wheel disposed adjacent the conveying means. The worm screw is provided with a suitable pitch permitting the engagement of the article to be decorated and movement from the conveying means into the receptacle means with the pitch of the worm screw and the star-wheel being synchronized to that of the spacing between receptacle means.

The decorating station preferably comprises a rotating turret which supports the receptacles, as well as the means for heating and applying the labels to the articles. A sun gear, synchronized with the web, drives a plurality of planetary gears coupled to the receptacles causing rotation of the articles with respect to the web.

The decorating station is also provided with a plurality of nozzles disposed above each of the receptacles and coupled to an external air supply. The nozzles are movable vertically up or down by a cam arrangement for selectively engaging the necks of articles disposed in the receptacles. The nozzles are used to inflate the articles (if required) to stiffen the article side surface during application of the labels.

Beneath the receptacle means is provided an article shifting means for shifting the articles vertically with respect to the receptacles. The article shifting means is synchronized with the nozzles to accept articles at a first loading station along the turret and to dislocate the articles from the receptacle means at a second or discharging location.

Preferably, disposed between the conveyor means and the decorating station, is located an indexing station. The indexing station includes a plurality of receptacles which hold corresponding articles, and rotating means for rotating the articles until a preselected orientation of the articles is achieved. A stationary sun gear is used to drive a plurality of planetary gears coupled to the receptacles to obtain the rotary motion described above.

Accordingly, it is the objective of the present invention to provide an effective and reliable method of and apparatus for transferring label decorations to hollow objects.

A further objective is to provide an apparatus in which the articles being decorated are moved continuously without any intermittent operation.

Yet another objective of the invention is to provide an apparatus which automatically indexes or orients articles prior to labelling to provide for predetermined positioning of the label with respect to the surface of the article.

These and other objects of the invention shall become more apparent from the following description of the invention, taken in conjunction with the drawings.

DESCRIPTION OF THE PREFERRED EMBODIMENT

Figure 1:
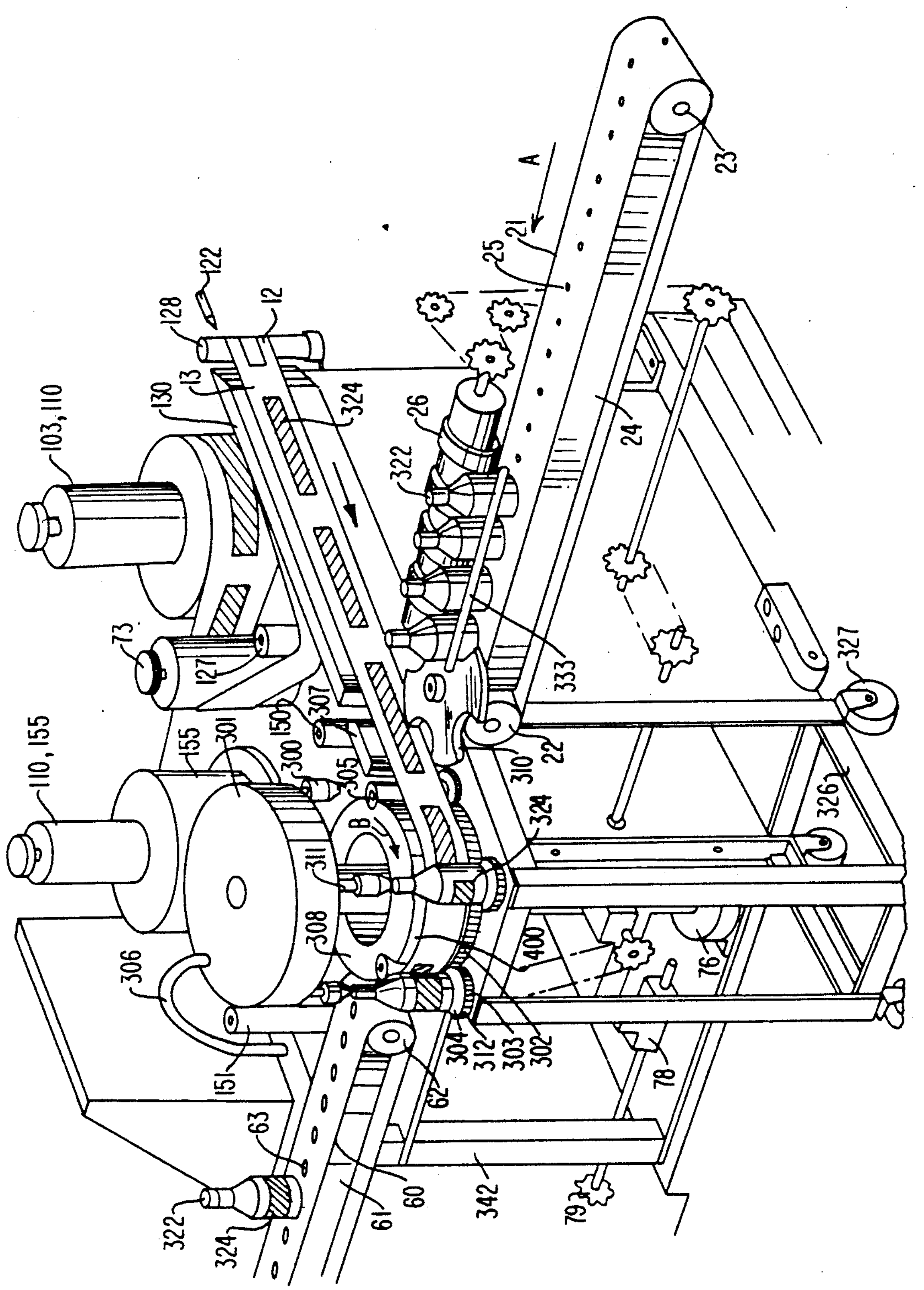
FIG. 1 is a perspective view of the label-applying apparatus constructed in accordance with this invention.

Referring now to the drawings, and more particularly to FIG. 1, a decorating apparatus according to this invention includes an input feeder conveyor belt 21 driven by rollers 22 and 23 in direction A. Below the upper surface of the belt 21, a vacuum box 24 is disposed for drawing air through holes 25 thereby holding articles 322 on the belt. Toward the end of belt 21, a worm screw 26 cooperates with a stationary bracing bar 333, and a star wheel 310 to load articles or bottles 322 onto a decorating station or turret described more fully below. At the decorating station, a label or decal 324 is applied to the surface of bottle 322 being decorated, after which the decorated bottle is shifted to a discharging conveyor belt 60. Belt 60 is moved by roller 62 and is provided with another vacuum box 61 to draw air through holes 63 to hold bottles 322 on belt 60 after processing at the decorating station.

Figure 3:
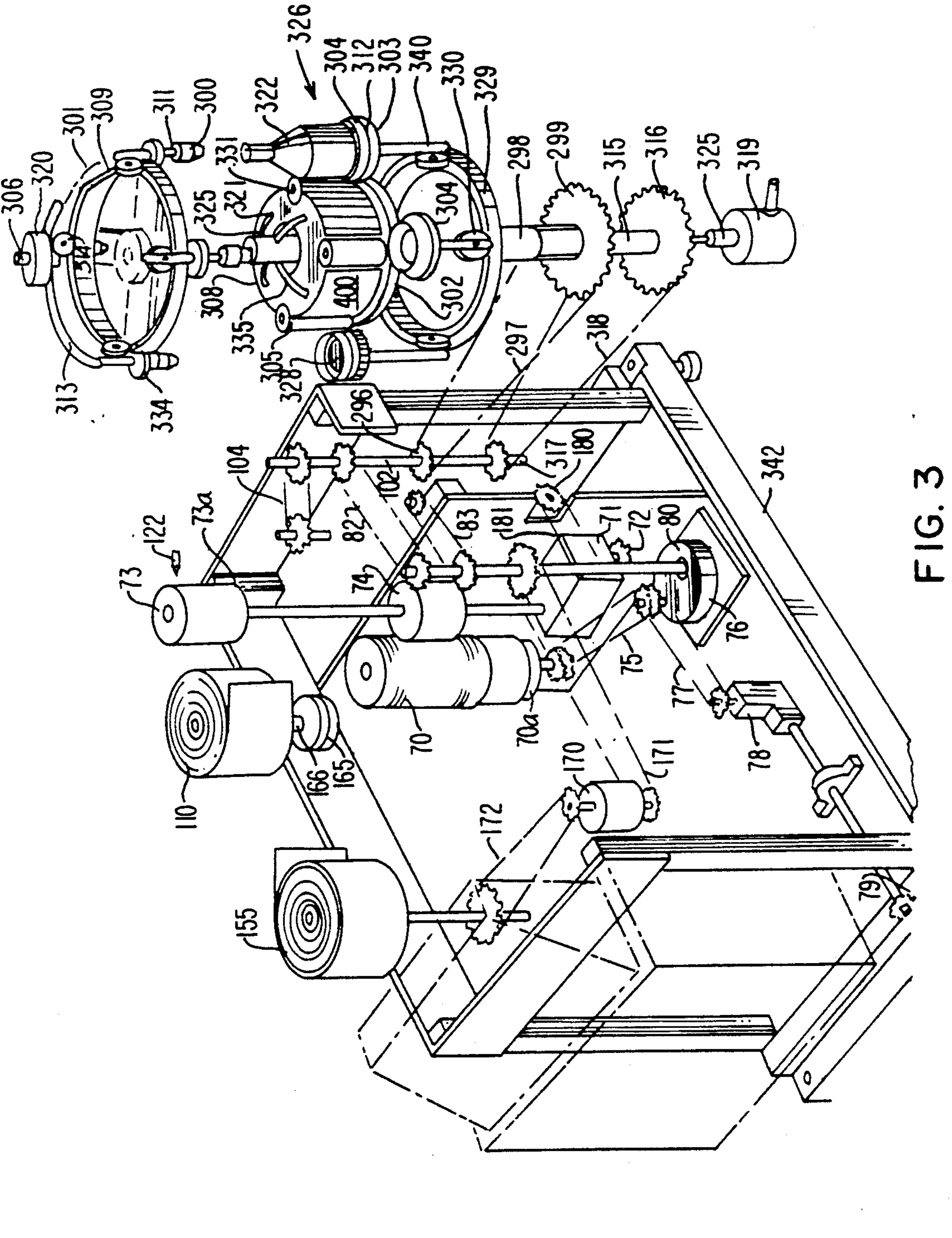
FIG. 3 is a perspective view of the turret drive means for the apparatus of FIG. 1.

The turret 326, shown in detail in FIG. 3, includes a heating drum 308 which has a cylindrical outer surface 400 which is heated by heaters contained within the drum. The heaters may be, for example, electrical heaters which are connected by electric cables 325 passing through hollow shafts 298 and 315, and commutator 319 to an external electric supply. Four transfer rollers 305 are disposed within cylindrical grooves disposed around the circumference of the drum 308. These rollers are freely rotatable on shafts 331 and are made of a resilient material. Roller shafts 331 and drum 308 are mounted or secured to a rotary shaft 315. Also mounted on the shaft 315 are four planetary holding arms 312, each extending radially outwardly of drum 308. Each arm 312 supports a planetary gear 303 which is meshed With the teeth of a sun gear 302. Sun gear 302 is mounted on a shaft 298 which is concentric with but rotatable independently of shaft 315.

A receptacle or cup 304 is mounted on each gear 303. Each cup 304 is provided with a bottom plate 328 (shown in FIG. 3) which is vertically movable with respect to the cup. A plate stem 340 is attached to plate 328, and extends downward therefrom. At the lower end of the plate stem 340, is mounted a cam follower wheel 330 rotatable around a horizontal axis. Wheel 330 is associated with cup 304 and travels around a stationary circular cam surface 329 disposed concentrically with shaft 315.

A spider arrangement 334 is disposed at the upper end of shaft 315, and holds a plurality of bottle engaging nozzles 300. Each nozzle 300 is arranged in vertical axial alignment with respect to a corresponding cup 304 and is mounted on a hollow nozzle stem 311. Each nozzle 300 is freely rotatable around the respective stem 311 with which it is associated. Each stem 311 supports a cam follower wheel 314*e* which rides on a second stationary circular camming surface 309 disposed concentrically with shaft 315. Each stem 311 is slidably mounted with respect to spider 334 arrangement so that the stem and nozzle may be moved vertically. Each stem 311 is further coupled via a tube 313 to a rotating union 320 which is coupled to a regulated air supply via a stationary supply tube 306. As shown in FIG. 1, the spider 334, stems 317, pipes 313 and union 320 are covered by a protective housing 301.

Figure 2:
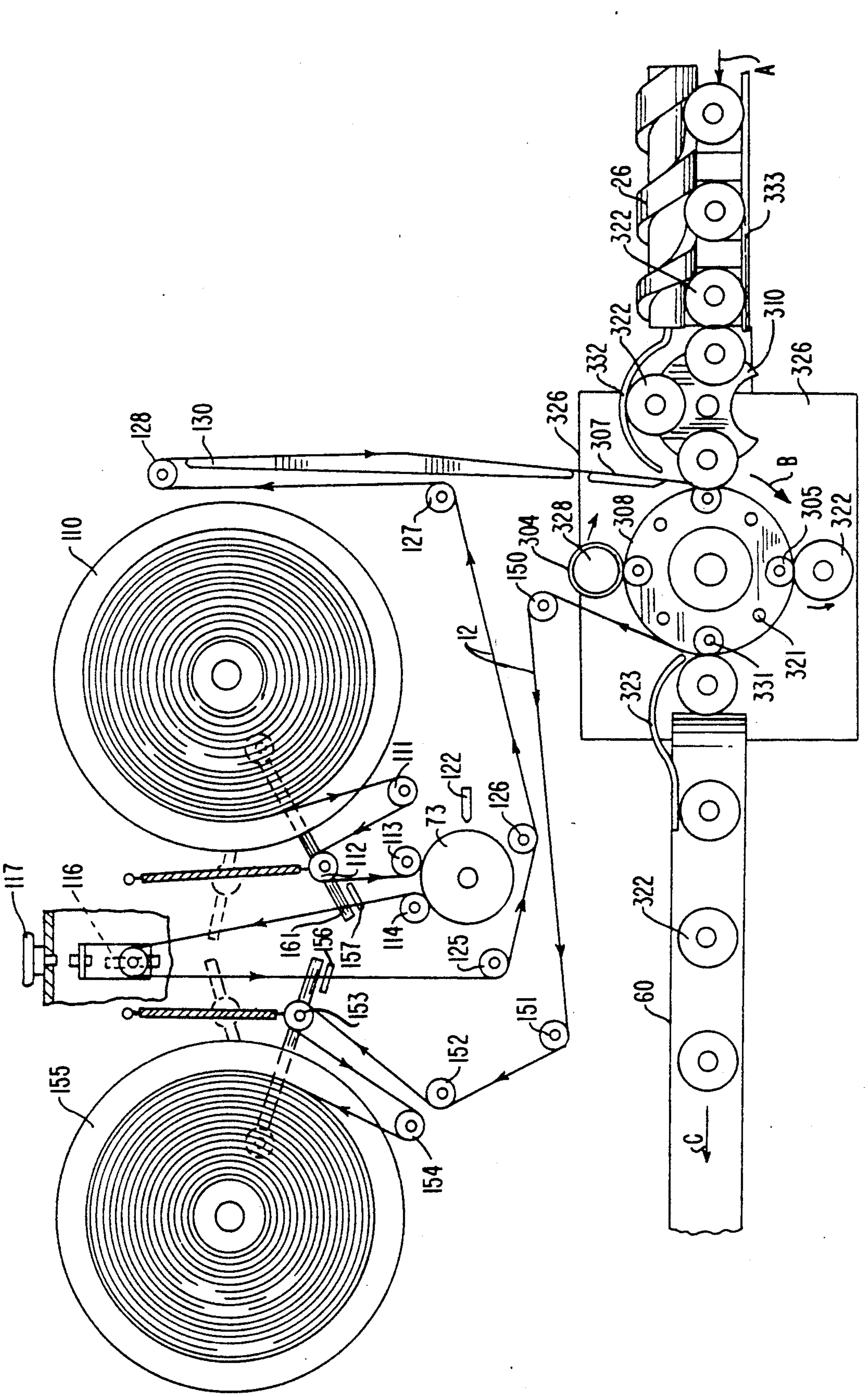
FIG. 2 is a partial plan view of the apparatus of FIG. 1 illustrating the path of the articles processed through the label application station, and the path of the web holding the labels.

In addition, the apparatus is provided with means for supplying a continuous web including a plurality of labels. More particularly, the apparatus includes a supply reel 110 and shaft 103 for holding a roll or web of labels. A re-wind reel 155 is also provided for collecting the web from the decorating station after the labels have been transferred to the bottles. As shown in FIG. 2, rollers 111, 116, 125, 126, 127 and 128 are used to guide the web 12 to the decorating station or turret 326. Rollers 150, 151, 152, and 154 guide the web to the re-wind reel 155.

Rollers 153 and 112 are spring loaded and used to tension the web. Roller 73 is a metering roller which drives the web at a predetermined speed in conjunction with an electric eye 122. Details of the metering roller and its feeding means are discussed in U.S. Pat. No. 4,019,935. Rollers 113 and 114 guide the web toward and away from roller 73. Two stationary heaters 130, 307 are used to preheat the web 12 and the labels 324 before the labels arrive at drum 308.

The reels 110, 155, heater 130 and the web-transport rollers described above are mounted on a stationary frame 342. Frame 342 also supports the discharge conveyor belt 60 as well as the mechanisms used to drive the various shafts described above. More particularly, as shown in FIG. 3, there is provided a motor 70 with a drivehead 70*a* which drives a speed reducer gear box 76 via chain 75. Gear box 76 engages shaft 80 which drives jack-shaft 102 via chain 82. Shaft 102 drives sprocket 317 which is coupled through chain 318 to sprocket 316 which in turn drives shaft 315. As previously mentioned, shaft 315 rotates heater drum 308, planetary arm 312 and spider 334.

Shaft 102 also has sprocket 296 which is coupled by chain 297 to sprocket 299. Sprocket 299 drives shaft 298 which rotates sun gear 203. The various sprockets and gears are arranged and constructed so that as heater drum 308 and planetary arm 312 turn approximately 180° to cover the arc between the star-wheel 310 and the discharge conveyor 60, cup 304 which is coupled to sun gear 302 by planetary gear 303 turns a preselected angle about its vertical axis. The predetermined angle is selected based on the circumference of the bottle 322 and the longitudinal length of the label to be applied. If the two dimensions are substantially equal, the predetermined angle is 360°. As shown in FIG. 3, shafts 80 and 102 also drive various other rotating members of the apparatus in a manner well known in the art.

Cam surface 329 is constructed and arranged so that at the point where a cup 304 is adjacent to feeder conveyor belt 21, the plate stem 340 and plate 328 are raised to allow plate 328 to accept an article or bottle being fed from conveyor belt 21. As cup 304 is rotated about shaft 315 in the direction indicated by arrow B, surface 329 drops gradually from an upper to a lower position allowing bottom plate 328 to be lowered into cup receptacle 304. As cup 304 approaches discharge conveyor 60, cam source 329 rises again to the upper position thereby raising bottom plate 328. The second or upper cam surface 309 is shaped in a similar manner. From a point where nozzle 300 is adjacent to feeder conveyor 21, the surface drops gradually from an upper to a lower position allowing the nozzle 300 to be lowered thereby engaging the neck of the bottle 322. After decorating, nozzle 300 is upwardly raised near the discharge conveyor into its upper position, thereby releasing the bottle which has the label applied thereto.

The operation of the decorating apparatus of FIGS. 1–3 will now be described. A plurality of articles depicted with cylindrical surfaces such as plastic bottles 322 are placed on the feeder conveyor 21. As the bottles approach turret 326, along direction A, they are aligned and spaced by aligning bar 333 and worm screw 26. Star wheel 310 is synchronized with planetary arm 312 so that as the star wheel 310 rotates, it picks off one bottle at a time from conveyor 21 and shifts it to a cup 304. As shown in FIG. 2, sidewall 332 helps to keep the bottle engaged with the star wheel. The bottom plate 328 of this cup has been previously raised by cam surface 329 allowing a smooth transfer of the bottle 322 from the conveyor to the cup. As the bottle 322 leaves the star wheel in cup 304, the bottom plate 328 is lowered, allowing the bottle 322 to be nested securely in the cup. Acting generally concurrently with the bottom plate, nozzle 300 is lowered and engages the neck of the bottle. The nozzle 300 thus holds the bottle securely in place. Air from nozzle 300 enters the bottle under pressure and thereby serves to stiffen the cylindrical sidewall of the bottle during the application of a label thereto.

Meanwhile web 12 bearing a plurality of labels 324 is routed to the turret. Heaters 130 and 307 preheat the web 12 and labels 324, which are raised to an even higher temperature by heater drum 308 as well as roller 305 which picks up heat from the drum. The labels 324 are positioned and the web is driven at a speed so that the label is fed to a press nip formed between the bottle 322 and roller 305. Because of the heat applied to the label and the web, the label is released by the web in the nip and transferred to the bottle. The label may also be coated with an adhesive which is activated by heat and which sets after the bottle is cooled thereby securing the label to the bottle. As previously mentioned, cup 304 is rotated 360° around its own shaft as it is moved from the feeder to the discharge conveyor by planetary arm 312. This simultaneous planetary motion is transmitted to the bottle, so that label 324 may be applied circumferentially around the entire cylindrical sidewall of the bottle 322. Of course, if a shorter label is used, it will cover only an angular portion of the bottle. The planetary rotation of the bottle is permitted by nozzle 300 because the nozzle is also rotatable around its support stem as previously described. After the label has been applied, the bottle is released from the cup bottom plate and the nozzle. The labelled bottle 322 is then taken off from the cup by a stripper sidewall 323 and shifted to conveyor 60 which conveys it in direction C toward a filling or packing station.

The turret support frame 326 may be mounted on roller 327 so that it may easily be rolled away from the conveyors (after the chains, the air pipe, and electric lines have been disconnected) to allow other operating machinery to be placed there for other purposes, e.g., a different sized or shaped bottle. This may readily be accomplished by appropriate sizing and shaping sun gear 302 and planetary gears 303. If a different shape bottle, for instance, an oval shape, is to be decorated, sun gear 302 would be circular and planetary gears 303 would be oval shaped (conform to shape of article) and the apparatus operated as otherwise described herein.

Figures 5, 9:
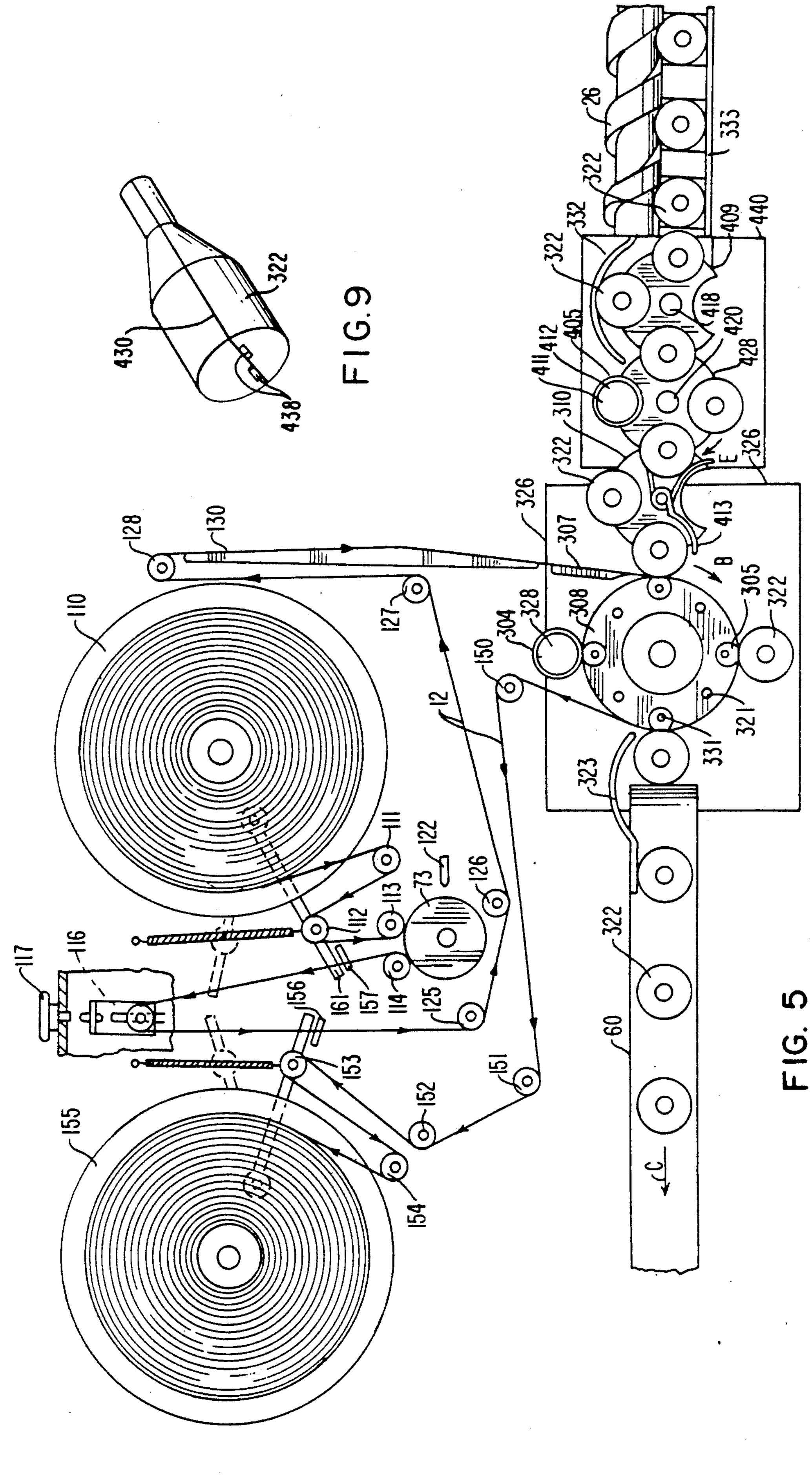
FIG. 5 is a partial plan view of the apparatus of FIG. 4.
FIG. 9 is a perspective view of a bottle having a seam and indexing indentations.

Thus, labels are applied to cylindrical surfaces of the bottles in a continuous and efficient manner. Frequently the bottles being decorated are made by a molding process which results in one or more seams extending axially along the cylindrical surface of the bottles. When a label applied to the surface overlaps a seam it may become distorted which when fine print appears on the label may be difficult to read. Furthermore, fine print on the label may be hard to read if the label overlaps a seam. Therefore, preferably the bottle is oriented in such a manner that the seam will not be overlapped by the label. A typical bottle 322 with a seam 430 is shown in FIG. 9. In order to assist in the indexinq, the bottle is provided with lugs or indentations 438 on its bottom surface disposed at a preset location with respect to the seam 430.

An alternate embodiment of the invention is shown in FIGS. 5–8. In this embodiment, an indexing station is provided between the conveyor belt 21 and the decorator station described above.

Figure 4:
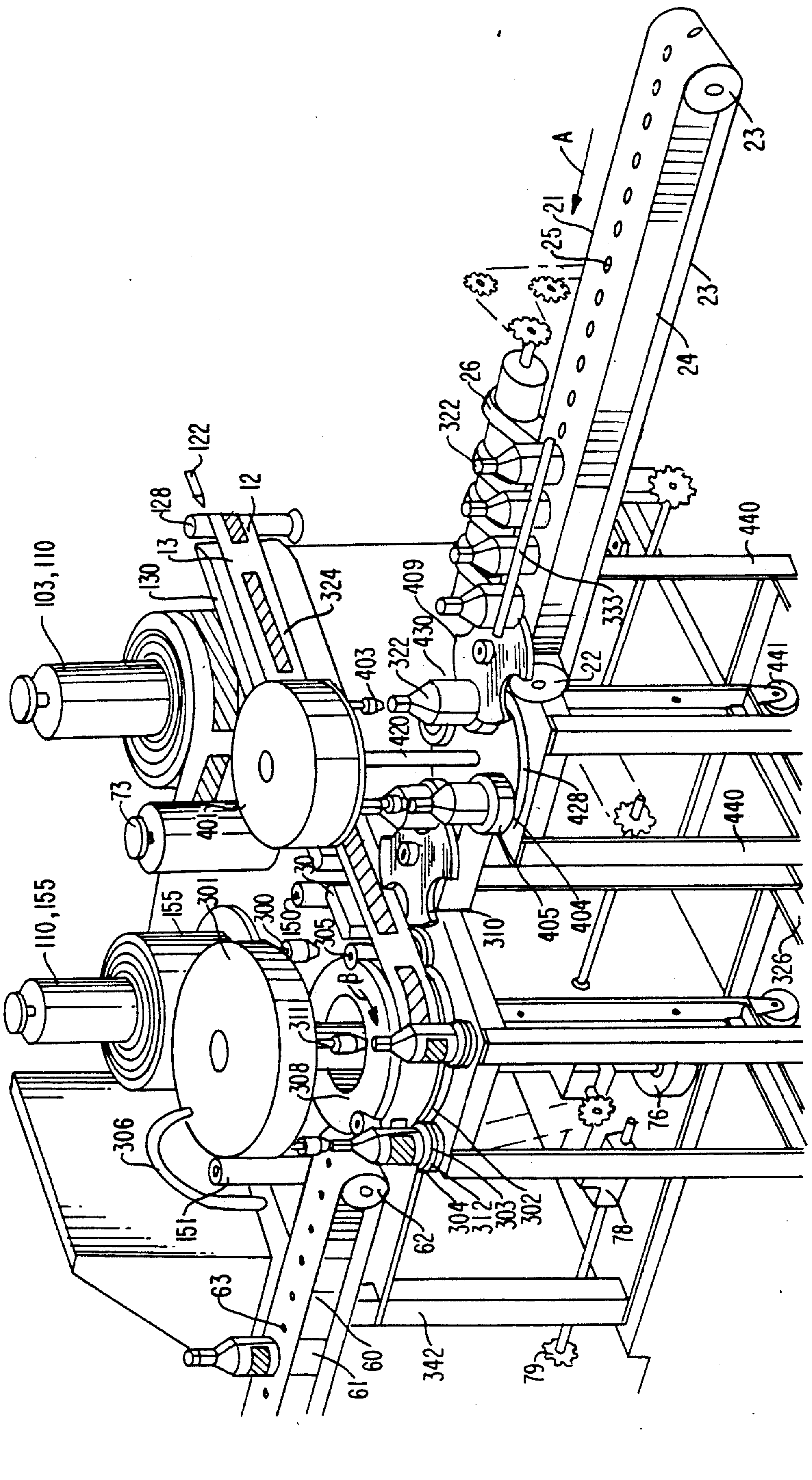
FIG. 4 is an alternate embodiment of the invention including an indexing station.
Figure 6:
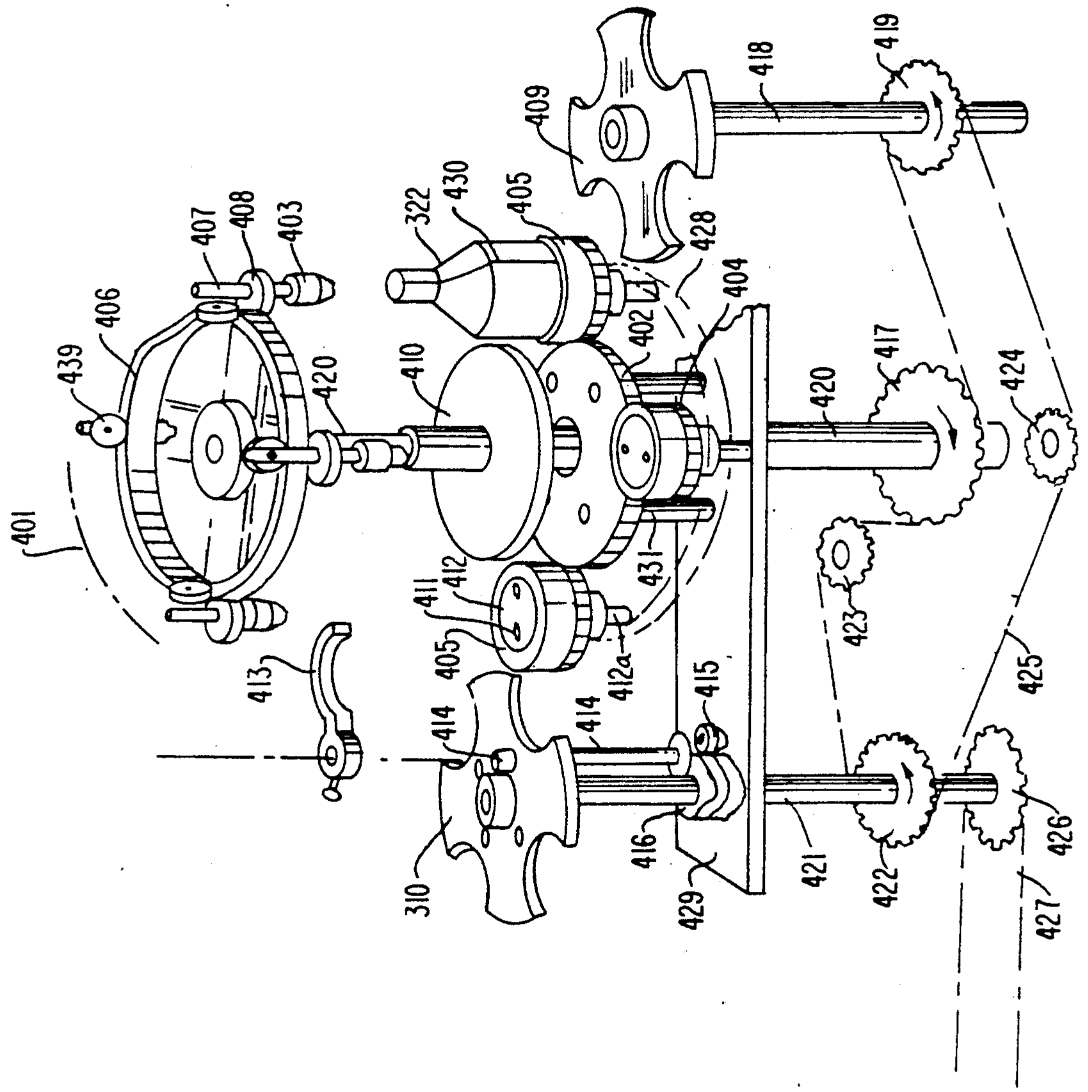
FIG. 6 is an enlarged perspective view of the indexing station of FIG. 4.

The indexing station shown in detail in FIG. 6, includes four planetary gears 404 mounted on disk 428 which is fastened to shaft 420. Disk 428 may be replaced by a spider. Planetary gear 404 is in mesh with the stationary sun gear 402 mounted on plate 429. A receptacle or cup 405 is mounted on and is frictionally engaged by each gear 404. Each cup 405 is provided with a bottom plate 412 (shown in FIG. 6) which is vertically movable with respect to the cup 405. The cup 405 is rotatable with respect to plate 429. The indexing station assembly is mounted on a frame 440 which is movable into position when required. Insertion of the indexing station is facilitated by moving conveyor 21 and worm screw 26 away from the decorating station to facilitate operation of the apparatus as depicted in FIG. 4. As contrasted with the assembly of FIG. 1, with the indexing station in place, star wheel 40 receives the bottle from the worm screw 26 and star wheel 310 feeds the bottle in to the decorating station.

A spider arrangement 408 is disposed at the upper end of shaft 420, and holds a plurality of bottle engaging nozzles 403. Each nozzle 403 is arranged in a vertical axial alignment with respect to a corresponding cup 405 and is mounted on stem 407. Each nozzle 403 is freely rotatable around the respective stem 407 with which it is associated. Each stem 407 supports a cam follower roller 439 which rides on a stationary circular camming surface 406 disposed concentrically with shaft 420. Each stem 407 is slidably mounted with respect to spider arrangement 408 so that the stem and the nozzle may be moved vertically.

Figure 7:
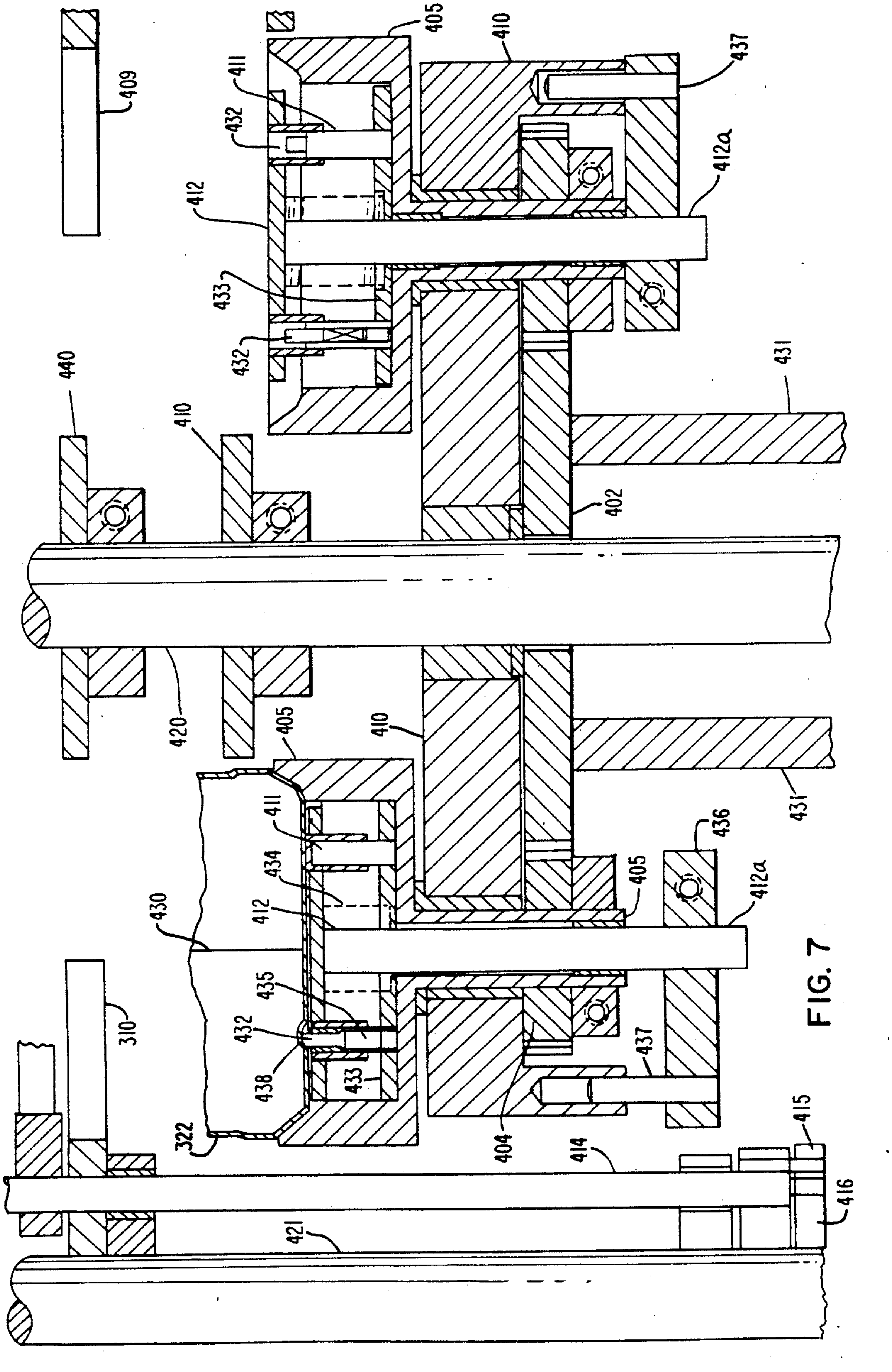
FIG. 7 is a partial enlarged cross-sectional view of the indexing means of FIG. 6.
Figure 8:
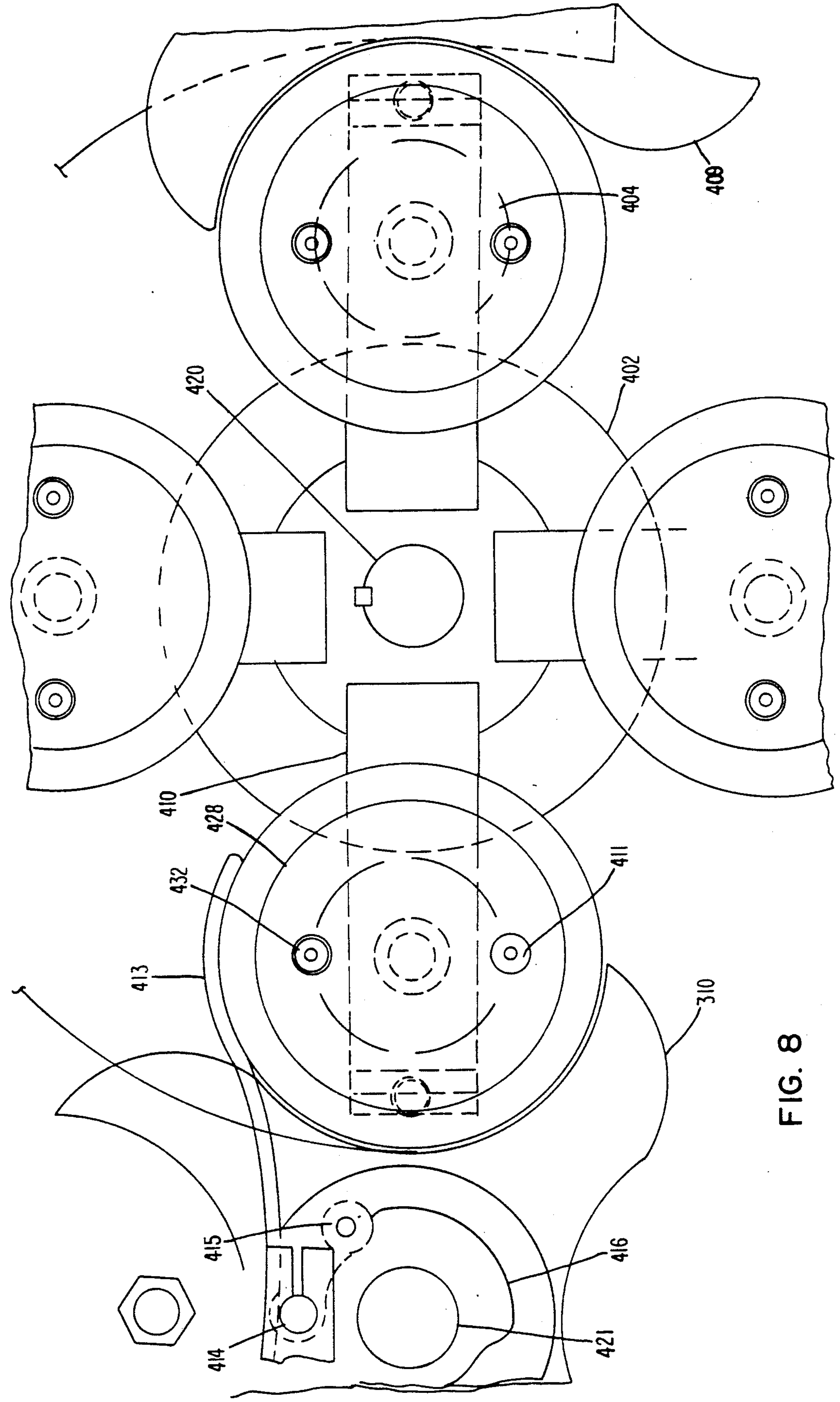
FIG. 8 is a plan view of the indexing means of FIG. 4.

Cam surface 406 is constructed and arranged such that at the point where cup 405 is adjacent to feeder conveyor belt 21, the spring loaded plate stem **412*a* and plate 412 are raised along with nozzle 403 and nozzle stem 407 to allow cup 405 and nozzle 403 to be rotated by shaft 420 (as indicated by arrow E). At that time, cam surface 405 drops from the upper to the lower position causing nozzle 403 to engage the bottle neck and force bottle 322 into cup 405 while lowering spring loaded plate 412. The bottom plate 412 also has two holes to guide and expose two index pin assemblies 411 (shown in FIG. 6) mounted on support ring 433 (FIG. 7). As bottom plate 412 moves down with the bottle 322, spring loaded 435 index pins 432 are exposed through the top of plate 412**.

When the cup 405 is rotated by corresponding planetary gear 404 by means of contact friction, it turns bottle 322 against spring loaded index pins 432 which are radially fixed by dowel 437 and bracket 436. As lug indentation 438 passes over spring loaded index pins 432, one pin 432 is urged into lug indentation 438 (lug indentation 438 and index pins 432 are in radial alignment) stopping the rotating movement of bottle 322 and in effect indexing or orienting the bottle seam 430. Lug indentation 438 is always positioned in the same indented position relative to the seam 430 during the molding of the bottle.

By radially adjusting the index pin assembly 411 through bracket 436, seam 430 placement can be set in any desired position with respect to the label decoration.

As cup 405 approaches indexing exit starwheel 310, cam surface 406 rises again to the upper position raising the nozzle stem 407 and the nozzle 403 thereby allowing spring loaded plate 412 to raise bottle 322 so as to clear cup 405 as it exits into starwheel 310.

Starwheel 310 is fitted with a bottle holding brake arm 413 to prevent bottle 322 from rotating after the seam has been properly oriented. Arm 413 is mounted on shaft 414. Shaft 414 is actuated by stationary cam 416 through cam follower roller 415. Starwheel 310 is driven by shaft 421.

A plurality of brake arms 413, shafts 414 and cam roller 415, are provided, one for each bottle nest cut into starwheel 310. Cam 416 is mounted on plate 429 and the cam contour is such that when starwheel 310 receives a bottle 322 from plate 412 the bottle holding brake arm 413 is in the open position and closes on bottle, plate 412 moves up and bottle lug 438 is clear of index pin 432.

The brake arm 413 holds the bottle in the starwheel nest as it rotates to deliver bottle 322 in a seam oriented condition to the decorating turret infeed station and to the cup 304 in a synchronized mode.

At this point the bottle brake arm 413 opens as the decorating nozzle 300 and cup 304 capture the bottle 322 as it exits form starwheel 310. This entire decorating process is accomplished with a continuous flow of bottles moving with a continuous operating motion.

The indexing turret is driven and kept in synchronization by chain 427 from the decorating turret shaft 315. Chain 427 in turn drives shaft 421 through sprocket 426 (FIG. 6). Shaft 421 turns starwheel 310 and drives sprockets 417, 419, 423, 424 and shafts 420 and 418 in direction of arrows shown on the sprockets in FIG. 6.

The operation of the seam indexing apparatus will now be described. A plurality of articles with cylindrical surface such as plastic bottles approach turret 440, (along direction A) and aligned and spaced by aligning bar 333 and worm screw 26. Star wheel 409 is synchronized with planetary disk 428 so that as the star wheel 409 rotates, it picks off one bottle at a time from conveyor 21 and shifts it to cup 405. As showing in FIG. 5, sidewall 332 assists in keeping the bottle engaged with the starwheel.

The bottom plate 412 of this cup 405 has been previously raised by cam surface 406 allowing for a smoother transfer of bottle 322 from the conveyor to cup 405. As the bottle 322 leaves the star wheel in cup 405, nozzle 403 is lowered and engages the neck of bottle forcing the bottle 322 to nest and seat in the cup 405 (FIG. 5), lowering spring loaded plate 412.

As previously mentioned, cup 405 is rotated around by its shaft as it is moved from the feeder to the discharge or exit star wheel 310 by planetary disk 428. This simultaneous planetary motion is transmitted to bottle 322. As previously described, this rotary motion of the bottle is stopped by one of two spring loaded index pins 432 protruding from holes in the bottom plate 412 and properly aligns the bottle seam through a lug indentation at the bottom of the bottle. The diameters of the planetary gears and new gears are selected so that the cup turns by at least 180 degrees around its axis as it is rotated from the conveyor to the decorator station. The planetary rotation of bottle is permitted by nozzle 403 because the nozzle is also rotatable around its support stem.

As described earlier, the bottle is picked off in a seam oriented condition by the star wheel 310 which is fitted with a bottle holding brake arm 413 for each nest on the star wheel 310. The bottle brake arm 413 holds the bottle in the proper seam oriented position in star wheel 310 until it is delivered to the decorating station's infeed station and to decorating cup 304 and nozzle 300 in a properly synchronized mode.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An apparatus for applying decorative labels to articles comprising:

a transfer station with transport means for transporting at least one of said decorative labels and one of said articles in a contacting relationship from a first location, holding means for holding said articles as said articles are transported from said first to a second location and for turning said one article around an article axis as said one article and said one label are being transported in a continuous motion from said first to said second location, and transfer means mounted on said turning means and including rotatable roller means, said roller means cooperating with said holding means to form a press nip with said article for securing said label on said article surface as said article is turned; and articles feeding means for feeding articles to said first location continuously.

2. The apparatus of claim 1 wherein said article feeding means comprises conveying means for conveying articles to a third location adjacent to said first location, and article loading means for loading articles from said third to said first location.

3. The apparatus of claim 2 further comprising article discharging means for removing articles from said transfer station.

4. The apparatus of claim 3 wherein the article discharging means comprises a discharge conveyor and an article unloading means for transferring said articles from said transfer station to said discharge conveyor.

5. The apparatus of claim 1, further comprising label feeding means for feeding labels to said transfer station.

6. The apparatus of claim 5 wherein said label feeding means comprises a web carrying a plurality of labels.

7. The apparatus of claim 1 wherein said transfer station further comprises heating means for heating said labels.

8. The apparatus of claim 1 further comprising indexing means for rotating said articles to a preselected orientation before contacting said labels.

9. An apparatus for applying decorative labels to cylindrical surfaces of articles comprising:

a label feeding means for feeding labels consecutively;

article feeding means for feeding articles consecutively; and a transfer station for receiving labels from said label feeding means and for receiving articles from said article feeding means, said transfer station including first turning means for turning at least one of said labels simultaneously with at least one of said articles in contact with said one label and holding means for holding said articles, said one label and said one article being moved from a first to a second location by said first turning means in a continuous motion, label applying means including roller means rotatably mounted on said first turning means and cooperating with said holding means to form a press nip with said one article for applying said label on the cylindrical surface of said one article while said one label and one article are moved from said first to said second location; and second turning means for turning said one article around an axis passing through said one article as said label is applied.

10. The apparatus of claim 9 further comprising heating means for heating said labels.

11. The apparatus of claim 9 wherein said label feeding means comprises a web carrying said labels.

12. The apparatus of claim 9 wherein said article feeding means comprises a feeding conveyor which feeds articles and loading means for moving said articles from said feeding conveyor to said transfer station.

13. The apparatus of claim 9 further comprising indexing means for rotating said articles to a preselected orientation before contacting said labels.

14. An apparatus for applying decorative labels to the outer surface of hollow articles, said outer surface having an axial seam, comprising:

a decorating stations comprising means for receiving said articles and said labels in a continuous manner; means for moving one of said labels and one of said articles from an input to an output location while affixing said label to said article, said means for moving comprising, transport means for transporting at least one of said decorative labels and one of said articles in a contacting relationship from a first location, holding means for holding said articles as said articles are transported from said first to a second location and for turning said one article around an article axis as said one article and said one label are being transported in a continuous motion from said first to said second location, and transfer means mounted on said turning means and including rotatable roller means, said roller means cooperating with said holding means to form a press nip with said article for securing said label on said article surface as said article is turned; and indexing means for receiving said articles and delivering said articles to said input location in a preselected orientation whereby said labels are applied to said articles in a continuous motion.

15. The apparatus of claim 14 wherein said articles are rotated to an orientation in which said label does not overlap said seam.

16. The apparatus of claim 15 further comprising an input conveyor for feeding articles having arbitrary orientations to said indexing means.

17. The apparatus of claim 15 further comprising an output conveyor for receiving articles with labels from said output location.

18. The apparatus of claim 14 wherein said articles have a longitudinal axis and said indexing means comprises support means, article holding means disposed on said support means for receiving and holding articles, rotating means coupled to said article means for rotating said articles around said longitudinal axis until said preselected orientation is reached, and drive means for driving said support means to move said articles to said input location.

19. The apparatus of claim 18 wherein said articles have indentation means disposed at a preselected spacing from said seam, and said indexing means includes engaging means for engaging said indentation means.

20. An apparatus for applying labels continuously to hollow articles, each article having an outer surface with a seam crossing said surface, comprising:

an indexing station for rotating an article to a preselected orientation while said article is moved from an indexing input location to an indexing output location;

a decorator station for affixing a label to said article while said label and said article are moved continuously from said indexing output location to a decorator output station said decorator station comprising, a label feeding means for feeding labels consecutively;

article feeding means for feeding articles consecutively; and a transfer station for receiving labels from said label feeding means and for receiving articles from said article feeding means, said transfer station including, first turning means for turning at least one of said labels simultaneously with at least one of said articles in contact with said one label and holding means for holding said articles, said one label and said one article being moved from a first to a second location by said first turning means in a continuous motion, label applying means including roller means rotatably mounted on said first turning means and cooperating with said holding means to form a press nip with said one article for applying said label on the cylindrical surface of said one article while said one label and one article are from said first to said second location, and second turning means for turning said one article around an axis passing through said one article as said label is applied;

an input conveyor belt for feeding articles continuously to said indexing input location; and an output conveyor belt for receiving articles from said decorator output location;

said indexing and decorator stations cooperating to affix said label on said article surface without overlapping said seam.

21. The apparatus of claim 20 wherein said articles have a longitudinal axis and said indexing station comprises support means, article holding means disposed on said support means for receiving and holding articles, rotating means coupled to said article means for rotating said articles around said longitudinal axis until said preselected orientation is reached, and drive means for driving said support means to move said articles from said indexing input to said indexing output location.

22. The apparatus of claim 21 wherein said articles have indentation means disposed at a preselected spacing from said seam, and said indexing means includes engaging means for engaging said indentation means.

* * * * *